(12) United States Patent
Kokun et al.

(10) Patent No.: US 7,666,365 B2
(45) Date of Patent: Feb. 23, 2010

(54) PERFLUORIDE PROCESSING APPARATUS

(75) Inventors: Ri Kokun, Hitachi (JP); Shin Tamata, Oarai (JP)

(73) Assignee: Hitachi, Ltd., Tokyo (JP)

( * ) Notice: Subject to any disclaimer, the term of this patent is extended or adjusted under 35 U.S.C. 154(b) by 695 days.

(21) Appl. No.: 11/108,768

(22) Filed: Apr. 19, 2005

(65) Prior Publication Data
US 2005/0180897 A1    Aug. 18, 2005

Related U.S. Application Data

(63) Continuation of application No. 10/245,491, filed on Sep. 18, 2002, now abandoned.

(30) Foreign Application Priority Data

May 31, 2002   (JP)   ............... 2002-158505

(51) Int. Cl.
*F01N 3/10* (2006.01)
*B01D 50/00* (2006.01)
*B01D 53/34* (2006.01)
*F01N 3/00* (2006.01)

(52) U.S. Cl. .................. 422/173; 422/168; 422/177

(58) Field of Classification Search .............. 422/168, 422/173, 177
See application file for complete search history.

(56) References Cited

U.S. PATENT DOCUMENTS 5,659,110 A * 8/1997 Herden et al. ............. 423/219
5,811,066 A    9/1998 Winkler et al.
6,237,368 B1   5/2001 Beisswenger et al.
6,602,480 B1 * 8/2003 Mori .................. 423/240 S
6,949,225 B1   9/2005 Mori et al.

(Continued)

FOREIGN PATENT DOCUMENTS

EP    916388 A2    5/1999

(Continued)

OTHER PUBLICATIONS

Machine translation of JP 07246232 A.*

(Continued)

*Primary Examiner*—Walter D Griffin
*Assistant Examiner*—Natasha Young
(74) *Attorney, Agent, or Firm*—Dickstein Shapiro LLP

(57) ABSTRACT

A plurality of etchers such as poly-etchers 3 or the like are installed within a clean room 2. A duct 7 that is connected to all the etchers is connected to a PFC decomposition device 9, which is installed outside of the clean room 2. An exhaust gas which contains PFC as drained out of all the etchers within the clean room 2 is supplied by the duct 7 to the inner space of PFC decomposition device 9. After having heated up within the PFC decomposition device 9, the PFC is decomposed by the action of a catalyst which is filled within the PFC decomposition device 9. It is no longer required to provide a space for installation of the PFC decomposition device 9 in the clean room 2 with the semiconductor fabrication apparatus or the liquid crystal manufacturing apparatus installed therein, thus enabling size reduction or "downsizing" of the clean room. It is possible to reduce the size of a clean room in which a semiconductor fabricating apparatus or a liquid crystal manufacturing apparatus is installed.

14 Claims, 4 Drawing Sheets

U.S. PATENT DOCUMENTS

| | | | |
|---|---|---|---|
| 2001/0001652 A1 | 5/2001 | Kanno et al. | |
| 2001/0012501 A1* | 8/2001 | Hiraoka et al. | 423/210 |
| 2001/0029841 A1 | 10/2001 | Li et al. | |
| 2001/0031228 A1 | 10/2001 | Irie et al. | |
| 2002/0122750 A1 | 9/2002 | Kanno et al. | |

FOREIGN PATENT DOCUMENTS

| | | | |
|---|---|---|---|
| EP | 1 101 524 A2 | | 5/2001 |
| EP | 1 103 297 A1 | | 5/2001 |
| EP | 1101524 A2 | * | 5/2001 |
| EP | 1 205 234 A1 | | 5/2002 |
| JP | 07132211 A | * | 5/1995 |
| JP | 07246232 A | * | 9/1995 |
| JP | 11-70322 | | 3/1999 |
| JP | 11-319485 | | 11/1999 |

OTHER PUBLICATIONS

Machine translation of JP 07132211 A, which was published on May 23, 1995.*

* cited by examiner

PERFLUORIDE PROCESSING APPARATUS

The present application is a continuation of application Ser. No. 10/245,491, filed Sep. 18, 2002, now abandoned, the entire disclosure of which is incorporated herein by reference.

BACKGROUND OF THE INVENTION

1. Field of the Invention

The present invention relates generally to perfluoride processing apparatus and, more particularly, to perfluoride processing apparatus suitable for use during processing of perfluoride-carbon or perfluocarbon (PFC) gases which generate in semiconductor fabrication processes and liquid crystal manufacturing processes or the like.

2. Prior Art

In the semiconductor fabrication and liquid crystal manufacturing processes, PFC gases are used as an etching gas of semiconductor and liquid crystal materials, a cleaning gas of etchers, and a cleaning gas of chemical vapor deposition (CVD) equipment. However, PFC gases are the ones that are extremely significant in anathermal coefficient to an extent that it is ten thousand to several thousand times greater than that of $CO_2$. From a viewpoint of production efficiency without consumption of a total amount of PFC gas, the currently available semiconductor/liquid-crystal manufacturing processes are designed so that after having consumed 20 to 50% of the gas, the remaining PFC gas is exhausted and drained out of an etcher (or CVD equipment) as an exhaust or waste gas. For the purpose of precluding anathermalization of the Earth, it is required to perform PFC gas decomposition processing to thereby prevent the PFC gas from being released to external environment. Note that representative examples of the PFC gas include, but not limited to, $CF_4$, $CHF_3$, $C_2F_6$, $C_3F_8$, $C_4F_6$, $C_5F_8$, $NF_3$, and $SF_6$.

In order to suppress outward release or emission of PFC gases to external environment, it has been known in semiconductor and liquid crystal manufacturing industries that as disclosed in Japanese Application Patent Laid-Open Publication No. Hei 11-319485, perfluocarbon decomposition devices (referred to as PFC decomposition devices hereinafter) are installed in units of PFC gas-use etchers so that each is adjacent to its associated etcher, wherein a catalyst is used to perform decomposition processing of a PFC gas in exhaust gases as drained out of the etchers. This PFC decomposition device is equipped with a reaction unit which is filled with a PFC decomposing catalyst, a silicon component removing device which removes silicon components contained in an exhaust gas to be supplied to the reaction unit, a cooling chamber for cooling or refrigerating the exhaust gas that contains therein decomposition gas of the PFC as decomposed by the catalyst, and further an acidic gas removing device for removing an acidic gas contained in the exhaust gas as drained out of the cooling chamber. A catalyst-using PFC decomposition device is also disclosed in Japanese Application Patent Laid-Open Publication No. Hei 11-70322.

As the silicon component removing device, the cooling chamber and the acidic gas removing device require the use of water, it is a must to connect a water supply pipe to the individual PFC decomposition device. In view of the fact that each PFC decomposition device is installed within a clean room, respective water supply pipes being connected to them also are installed in the clean room. Water drain pipes also are connected to the PFC decomposition devices respectively. Due to this, part of the inner space of the clean room is to be occupied by the respective PFC decomposition devices and the water supply/drain pipes associated therewith. In case a clean room is newly formed with semiconductor fabrication apparatus (or alternatively liquid crystal manufacturing apparatus) such as a plurality of etchers installed together therein, a need is felt to acquire within the clean room an installation space of a plurality of PFC decomposition devices and a variety of types of utility equipment (such as water supply pipes and water drain pipes or the like) associated therewith, which would result in the space within the clean room being enlarged accordingly. Alternatively, in the case of installation of one or more PFC decomposition devices within the currently established clean room, it sometimes happens that the semiconductor fabrication apparatus (or liquid crystal manufacturing apparatus) such as etchers which have been installed within the clean room must be moved in order to acquire the installation space of the PFC decomposition devices and various types of utility equipment.

Because of the installation of a variety of types of utility equipment with respect to each PFC decomposition device within the clean room, it takes much time to install these facilities.

SUMMARY OF THE INVENTION

It is therefore an object of the present invention to provide a perfluoride processing apparatus capable of relatively reducing the size of a clean room and also a perfluoride processing method.

A principal feature of the present invention which attains the foregoing object lies in that it comprises an exhaust gas pipe connected to a plurality of semiconductor fabrication apparatuses installed within a clean room with perfluoride supplied thereto for permitting flow of an exhaust gas containing therein said perfluoride as drained out of the semiconductor fabrication apparatuses, and a perfluoride decomposition device connected to said exhaust gas pipe and installed outside of said clean room for decomposing said perfluoride as contained in said exhaust gas to be guided by said exhaust gas pipe.

In accordance with this invention, it is no longer required to acquire any extra space for installation of more than one perfluoride decomposition device within the clean room, which in turn makes it possible to reduce in size or "downsize" the clean room. In particular, in the case of application to the currently established clean room also, it is no longer necessary to acquire the installation space of such perfluoride decomposition device(s) within the clean room; thus, it makes it unnecessary to move the semiconductor fabrication apparatus within the clean room in order to perform installation of such perfluoride decomposition device(s).

A principal feature of the present invention which is applied to liquid crystal manufacturing architectures lies in that it includes an exhaust gas pipe connected to a plurality of liquid crystal manufacturing apparatuses installed within a clean room with perfluoride supplied thereto for permitting flow of an exhaust gas containing therein said perfluoride as drained out of the liquid crystal manufacturing apparatuses, and a perfluoride decomposition device connected to said exhaust gas pipe and installed outside of said clean room for decomposing said perfluoride as contained in said exhaust gas to be guided by said exhaust gas pipe. In this case also, it is no longer required to acquire any extra space for installation of more than one perfluoride decomposition device within the clean room, which in turn makes it possible to downsize the clean room. Especially in the case of applying to the currently established clean room also, it is no longer necessary to acquire the installation space of such perfluoride decomposition device(s) within the clean room; thus, it makes it unnecessary to move the liquid crystal manufacturing apparatus within the clean room in order to perform the installation of such perfluoride decomposition device(s).

Preferably the perfluoride decomposition device is equipped with a reaction unit in which a catalytic layer is provided and to which an exhaust gas containing perfluorides is supplied and which decomposes said perfluorides, and an acidic substance removing device which removes any reactive products as produced by chemical reaction with Ca salts of the acidic substance that is contained in the exhaust gas drained out of the reaction unit. The use of this perfluoride decomposition device causes the acidic substance being contained in the exhaust gas to be removed away as reactive products producible through reaction with Ca salts. Thus, no waste water generates from this perfluoride decomposition device.

DESCRIPTION OF THE INVENTION

Embodiment 1

Figure 1:
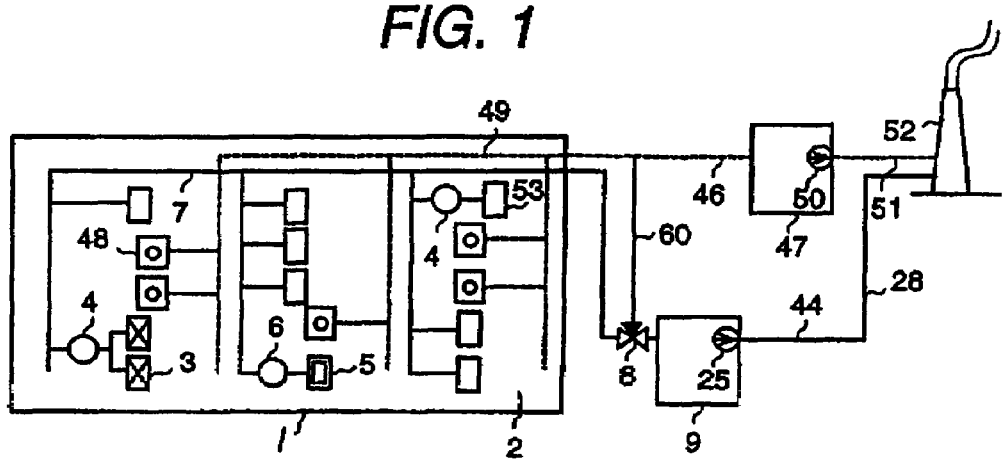
FIG. 1 is a diagram showing a configuration of PFC processing apparatus in accordance with one preferred embodiment of the present invention.

Prior to explanation of a perfluoride processing apparatus, that is, PFC processing apparatus, in accordance with one preferred embodiment of the present invention, a schematic configuration of a semiconductor fabrication system including a semiconductor fabrication factory will first be explained with reference to FIG. 1 below. The illustrative semiconductor fabrication system is equipped with a semiconductor fabrication factory, a PFC decomposition device 44, and a factory acidic gas processing equipment 46. The building 1 of semiconductor fabrication factory has therein a clean room 2. A plurality of semiconductor fabrication apparatuses including etchers such as poly-etchers 3, an oxide film etcher 5, and a metal etcher 53 are installed within the clean room 2. Also installed within the clean room 2 is a plurality of gas supply devices 48. The individual gas supply device 48 is the one that supplies gases (such as PFC gas or the like) required at etching and cleaning process steps to its corresponding etcher (i.e. semiconductor fabrication apparatus with PFC gas supplied thereto). The gas supply device 48 is designed for example to internally have a build-in cylinder or "bomb" receiving vessel (not shown) in which a plurality of bombs (not shown) that are filled with required gases.

The factory acidic gas processing equipment 46 comprises an acidic gas removing device 47, a gas collection duct 49 and an exhaust duct 51. The gas collection duct 49 is for connection between the space within the bomb-receiving vessel and the acidic gas removing device 47. The acidic gas removing device 47, which is installed out of the semiconductor fabrication factory building 1, is connected to the gas exhaust duct 51 through a blower 50. Depending upon the type of etcher, an acidic gas which is supplied from a bomb is used for wafer etching processes. When the acidic gas that is filled in the bomb leaks toward the outside by some causes, the bomb-receiving vessel is operable to prevent the leaked acidic gas from flowing into the clean room 2. Such leaked acidic gas as filled in the bomb-receiving vessel is driven by the blower 50 to reach the acidic gas removing device 47 through the gas collection duct 49 and is then removed away at the acidic gas removing device 47. The remaining gas with the acidic gas removed away is drained out of an exhaust cylinder 52 via the exhaust duct 51.

The PFC processing apparatus 44 comprises a duct 7, a PFC decomposition device 9 and a gas exhaust duct 28. The PFC decomposition device 9 is installed outside of the clean room 2 and within (or alternatively outside of) a little house (not shown) which is built within the site for the semiconductor fabrication factory at a location that is outside of the semiconductor fabrication factory building 1. The duct 7 is also connected to the polyetchers 3, oxide film etcher 5 and metal etcher 53 respectively, which are installed within the clean room 2, and is also connected to the PFC decomposition device 9. An acid gas removing device 4 is installed at the duct 7 at a position adjacent to a connection portion with the polyetchers 3. Another acid gas removing device 4 is also installed at the duct 7 at a position adjacent to a connection portion with the metal etcher 53. A carbon monoxide removing device 6 is installed at the duct 7 at a position near a connection portion with the oxide film etcher 5. The exhaust duct 28 is connected to the PFC decomposition device 9 through a blower 25 and also to the exhaust gas cylinder 52.

Figure 2:
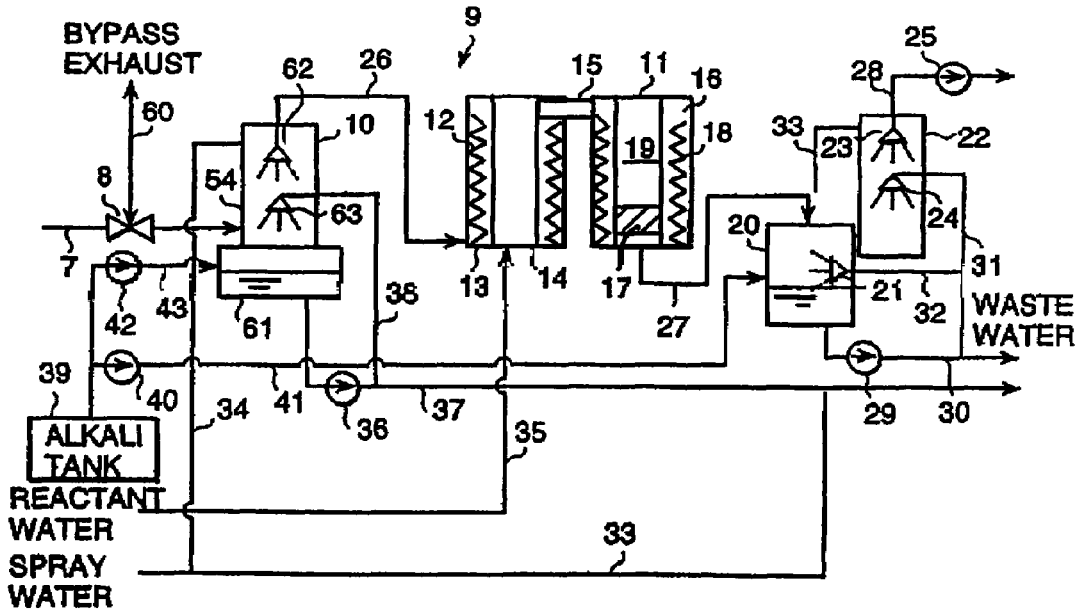
FIG. 2 is a diagram showing a detailed configuration of a wet-type PFC decomposition device of FIG. 1.

A detailed configuration of the PFC decomposition device 9 will be explained based on FIG. 2. The PFC decomposition device 9 includes a pre-processing tower 10, a reactor 11, a cooling device 20, and an acidic gas removing device 22. The preprocessing tower 10 has a solid component removing device 54 and a neutralizing tank 61 which is provided at lower part of the solid component removing device 54. Sprays 62, 63 are installed within the solid component removing device 54. The reactor 11 has a heating unit 12 and a reacting unit 16. The heater unit 12 is equipped with a heating device (for example, electric heater) 13 and forms a space 14 for use as a gas passage on the inner side of the heater device 13. The reaction unit 16 has a heating device (e.g. electric heater) 18 and a catalytic layer 17 as installed inside of the heater device 18. In the reaction unit 16, a space 19 for use as a gas passage is formed within the heater device 18 at a location overlying the catalyst layer 17. Upper part of the space 14 and upper part of the space 19 are coupled together by a duct 15. The cooler device 20 includes a spray 21 therein. Similarly the acidic gas removing device 22 also includes sprays 23, 24 therein.

The duct 7 is connected via a three-way valve 8 to the solid component removing device 54. One exhaust port of the three-way valve 8 is connected by a pipe 60 to the gas collection duct 49 at a location on the upstream side of the acidic gas removing device 47. The three-way valve 8 is an exhaust gas flow path changeover device which switches between the supplement of an exhaust gas to the solid component removing device 54 and the supplement to the pipe 60. The pipe 60 is a bypass pipe with respect to the PFC decomposition device 9. A pipe 26 connects together the solid component removing device 54 and the space 14 within the heater device 12. A space formed below the catalyst layer 17 within the reaction unit 16 is coupled by a pipe 27 to the cooler device 20. Upper part of the space within the cooler device 20 is coupled to the acidic gas removing device 22. The exhaust duct 28 is connected to the acidic gas removing device 22 at a location in on the upstream side of the blower 25. A water drain pipe 30 which is provided with a pump 29 is connected to a bottom portion of the cooler device 20. A pipe 31 that is connected to the water drain pipe 30 in the downstream of the pump 29 is connected to the spray 24. A pipe 32 connects the pipe 31 and the spray 21 together. A water drain pipe 37 in which a pump 36 is provided is connected to a bottom portion of the neutralizing tank 61. A pipe 38 which is connected to the water drain pipe 37 at a location in the downstream of a pump 36 is connected to the spray 63. A water supply pipe 33 is connected to the spray 23. The water supply pipe 34 connects together the water supply pipe 33 and the spray 62. A water supply pipe 35 is coupled to the space 14 within the heating unit 12. An alkali tank 39 is connected to the neutralization tank 61 via a pipe 43 which is provided with a pump 42 and is also connected to the cooler device 20 by a pipe 41 provided with a pump 40.

Supplied to the polyetcher 3 from its associated gas supply device 48 are $Cl_2$, HBr, $CF_4$ (in some cases, $CHF_3$, $C_5F_8$, $C_2F_6$ or else). CO, $CF_4$ (in some cases, $CHF_3$, $C_5F_8$, $C_2F_6$, $SF_6$ or else) are supplied to the oxide etcher 5 from its associated gas supply device 48. $Cl_2$, $BCl_3$, $CF_4$ (in some cases, $CHF_3$, $C_5F_8$, $C_2F_6$ or else) are supplied to the metal etcher 53 from its associative gas supply device 48. Respective one of the above-noted gases are filled in separate bumps in corresponding gas supply devices 48 on a per-kind basis. Although part of each kind of gas as supplied to each etcher is consumed during wafer etching processes, the remaining gas will be drained out of each etcher as an exhaust or waste gas. Within each etcher, HF that is an acidic gas is produced by decomposition of PFC($CF_4$) thus consumed therein. In addition to the HF, the exhaust gas contains by-products ($SiF_4$, $WF_6$ and the like) as has been produced by reaction between wafer rare material as cut away through etching and the PFC gas(es) along with solid components ($SiO_2$, $WO_3$ and others).

After removal of harmful acid gas ($Cl_2$) at the acid gas removing device 4, the exhaust gas as drained out of the polyetcher 3 is introduced into the solid component removing device 54 via the duct 7. After removal of harmful gas (CO) at the carbon monoxide removing device 6, the exhaust gas drained out of the oxide film etcher 5 is introduced into the solid component removing device 54 via the duct 7. After removal of harmful acid gases ($CO_2$, $BCl_3$) at the acid gas removing device 4, the exhaust gas drained out of the metal etcher 53 is introduced into the solid component removing device 54 via the duct 7. In cases where the PFC decomposition device 9 properly functions, the three-way valve 8 operatively couples together the etchers and the PFC decomposition device 9 to thereby ensure that the exhaust gas drained out of each etcher can flow into the PFC decomposition device 9. Due to this, any exhaust gas cannot flow from the duct 7 into the pipe 60. The exhaust gas as drained out of an etcher which uses no harmful gases is directly drained out of this etcher to the duct 7.

Water which was supplied from the water supply pipe 34 is continuously sprayed from the spray 62 into the solid component removing device 54. The exhaust gas to be supplied to the solid component removing device 54 contains PFC ($CF_4$) and also impurities which generate solid components by reaction with water such as $SiF_4$ and $WF_6$ or the like as produced during etching process along with solid component impurities such as $SiO_2$ and $WO_3$ or else. $SiF_4$ that is contained in the exhaust gas is decomposed into $SiO_2$ and HF by reaction of Equation (1) below.

$$SiF_4 + 2H_2O \Rightarrow SiO_2 + 4HF \qquad (1)$$

$SiO_2$ thus generated is ultra-fine or "micro" solid particles so that it is removed away from the exhaust gas by use of the sprayed water, simultaneously when it is produced. Other solid components (such as SiO, $WO_3$ and the like) that are contained in the exhaust gas when drained out of the etchers are also removed away. Regarding HF also, this is significant in water solubility; thus, it is possible to remove it from the exhaust gas in a similar way. Water which contains $SiO_2$ with once-removed HF being soluble thereinto drops down into the neutralization tank 61. $WF_6$ that is contained in the exhaust gas also reacts with water to thereby produce $WO_3$ (tungstic oxide) and HF in a way as defined by Equation (2).

$$WF_6 + 3H_2O \Rightarrow WO_3 + 6HF \qquad (2)$$

$WO_3$ is ultrafine solid particles and thus is removed from the exhaust gas by the sprayed water and then drops down into the neutralization tank 61 together with water. Silicon components and tungsten components which are contained in the exhaust gas may be removed away by bubbling such exhaust gas into water in a water tank.

As has been described previously, the solid component removing device 54 is operable to remove not only the solid components ($SiO_2$, $WO_3$ and the like) contained in the exhaust gas being supplied thereto but also acidic gases ($SiF_4$ and $WF_6$ or else) which produce solid components by reaction with water. During removal of an acidic gas which purifies such solid components, the solid component removing device 54 also removes the solid components ($SiO_2$, $WO_3$ and the like) thus generated by reaction with water. Since these acidic gases are removed through reaction with water within the solid component removing device 54 at a pre-stage of the reactor 11, it is possible to avoid unwanted production of solid components ($SiO_2$, $WO_3$ and the like) within the reactor 11 by reaction between such acidic gases ($SiF_4$ and $WF_6$ or else) and reactive water as supplied to the space 14. Thus it is possible to solve the problems due to production of solid components ($SiO_2$, $WO_3$ and the like) within the reactor 11—that is, (1) solid components badly behave to block porous components as formed at a catalyst, and (2) solid components block gaps to be formed between the catalyst. Whereby the catalyst which comes into contact with the exhaust gas does not decrease in surface area so that the PFC decomposition efficiency is improved.

The alkali water solution (e.g. sodium hydrate solution) within the alkali tank 39 is driven by the pump 42 to be supplied to the neutralization tank 61 through the pipe 43. The alkali solution acts to neutralize acidic materials such as HF or the like as contained in the water within the neutralization tank 61. The neutralized water within the neutralization tank 61 is driven by the pump 36 and then drained out as waste water to the water drain pipe 37. Part of such waste water is sent through the pipe 38 to the spray 63 and then sprayed thereby into the interior of the solid component removing device 54. The remaining waste water is drained out to waste water processing equipment as will be later discussed in the description. As the reaction of Equations (1) and (2) takes place due to the water in the waste water being sprayed from the spray 63 also, it is possible to reduce the use amount of new water to be sprayed from the spray 62. This results in a decrease in amount of the waste water being drained through the water drain pipe 37. The water as sprayed by the sprays 62, 63 absorbs acidic gases that reside within the exhaust gas to be supplied to inside of the solid component removing device 54 to thereby remove acidic gases away from the exhaust gas.

The exhaust gas which is drained out of the solid component removing device 54 is then introduced into the reaction unit 11 through the pipe 26—practically, to the space 14 of the heating unit 12. Water (reactive water) that is guided by the water supply pipe 35 is added to the exhaust gas within the space 14. In lieu of this water, water vapor or steam may be added to the exhaust gas. The exhaust gas and the added water within the space 14 are heated up by the heater device 13 so that the water becomes a steam. The exhaust gas as heated up by the heating unit 12 is then supplied through the duct 15 to the space 19 within the reaction unit 16. The exhaust gas is further heated up by the heater device 18 within the space 19 up to a temperature which ranges from 650 to 750° C. The heated exhaust gas flows into the inside of the catalyst layer 17. The catalyst layer 17 is filled with an alumina-based ($Al_2O_3$) catalyst—that is, a catalyst which has a composition of 80% of $Al_2O_3$ and 20% of $NiO_2$. Practically, such alumina-based catalyst is installed within the reactor 16 while making up an exchangeable cartridge type structure. $CF_4$ that is contained in the exhaust gas is decomposed into HF and $CO_2$ while being accelerated in reaction with the reactive water by the chemical reaction of the catalyst in a way as given by Equation (3).

$$CF_4 + 2H_2O \Rightarrow CO_2 + 4HF \quad (3)$$

Upon decomposition of 1 mole of $CF_4$, 4 mole of hydrofluoric acid (HF) is produced, which is four times greater in mount than the former. Note here that in case the PFC contained in the exhaust gas is $C_2F_6$, reaction such as defined by Equation (4) occurs causing $C_2F_6$ to be decomposed into $CO_2$ and HF.

$$C_2F_6 + 3H_2O + (½)O_2 \Rightarrow 2CO_2 + 6HF \quad (4)$$
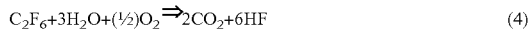

Oxygen for use during the reaction of Equation (4) is supplied as air to the interior space 14 via an air supply pipe (not shown). This air is heated up within the spaces 14, 19 and is then supplied to the catalyst layer 17. Alternatively, in case $SF_6$ is used as the PFC, reaction defined by Equation (5) takes place causing $SF_6$ to be decomposed into $SO_3$ and HF.

$$SF_6 + 3H_2O \Rightarrow SO_3 + 6HF \quad (5)$$

Upon decomposition of 1 mole of $SF_6$, 1 mole of $SO_3$ and 6 moles of HF which is six times greater in mount than it are produced.

The water that is guided by the water supply pipe 33 is sprayed by the spray 23 within the acidic gas removing device 22. This water is collected by the acidic gas removing device 22 into the cooler device 20. The water within the cooler device 20 is driven by the pump 29 so that it is drained to the water drain pipe 30. A portion of this water is supplied by the pipe 32 to the spray 21 whereas another portion of it is supplied by the pipe 31 to the spray 24; then, these are sprayed from respective ones.

In this embodiment, acidic substances such as HF and the like which are separated from exhaust gases and resolved in water is neutralized by supplying alkali solution to the neutralization tank 61 and the cooler device 20; thus, respective neutralization-processed waste water as drained out of the neutralization tank 61 and cooler device 20 improve in absorption ability (solubility) of acidic gases such as HF and the like as contained in the exhaust gases. Part of the waste water may be reused as the water to be sprayed from the corresponding sprays 63 and 24 to thereby make it possible to enhance the efficiency of removal of acidic gases contained in the exhaust gases.

The interior of an entire system including the pre-processing tower 10, the reactor 11, the cooler device 20 and acidic gas removing device 22 is retained by the blower 25 at negative pressures to thereby prevent leakage of HF or the like contained in the exhaust gas toward the outside of this system. Additionally the acidic gas removing device 22 is also modifiable to employ the bubbling scheme. Note however that either the spray scheme or the filling tower scheme is superior because of its advantage as to reduced pressure losses and the capability to downsize the blower for gas exhaust use.

The alkali water solution within the alkali tank 39 is driven by the pump 40 so that it is supplied through a pipe 41 to the interior of the cooler device 20. The alkali solution is used within the cooler device 20 to neutralize specific acidic substances such as HF and the like which are contained in the water drained out of the acidic gas removing device 22 and the water as sprayed from the spray 21, respectively. The neutralized water within the cooler device 20 is driven by the pump 29 and then drained through the water drain pipe 30 to wastewater treatment equipment (not shown). The wastewater treatment equipment is for removal of fluorine (also including fluorine contained as fluorides) as contained in waste water being supplied by the water drain pipes 30, 37 and also for outward delivery of the waste water from which fluorine was removed away.

The illustrative embodiment is such that all of the semiconductor fabrication apparatuses (etchers and chemical vapor deposition (CVD) equipment) which are installed within the clean room and to which PFC gases are supplied are connected via the duct 7 to the PFC decomposition device 9. With such an arrangement, it is possible to permit a single machine of PFC decomposition device 9 to process the PFC gases drained out of all of them in a concentrated way. Unlike the prior art, this embodiment is free from the need to connect a water supply pipe and a water drain pipe plus electrical wiring leads to a respective one of the plurality of PFC decomposition devices which are installed within the clean room and may be arranged so that such water supply and drain pipes and electrical wiring leads are connected to the single machine of PFC decomposition device 9. This in turn makes it possible to shorten a time taken to install the water supply/drain pipes and electrical wiring leads while at the same time reducing difficulties in installation works thereof.

In this embodiment the PFC decomposition device 9 is installed outside of the clean room 2. Due to this, in case a clean room is newly installed, the embodiment avoids a need to provide in the clean room 2 an extra installation space for the PFC decomposition device 9 and the water supply/drain pipes to be connected thereto, thereby enabling achievement of likewise size reduction or "downsizing" of the clean room 2. Another advantage lies in an ability to reduce the capacity of cleaning equipment for removal of residual contaminants or micro-dusts within the clean room 2 and that of air-conditioning/adjustment equipment which is operatively associated with the clean room 2. A further advantage lies in an ability to make easier both downsizing of the clean room 2 and layout alteration of semiconductor fabrication apparatuses. This can be said because the PFC decomposition device 9 and any required water supply/drain pipes connected thereto are not disposed within the clean room 2.

In cases where a PFC decomposition device is newly installed for processing of PFC gases as drained out of a plurality of etchers installed within the currently established clean room, installing the PFC decomposition device 9 outside of the clean room 2 in the way of this embodiment makes it easier to move the semiconductor fabrication apparatuses such as the etchers and replace such semiconductor fabrication apparatuses in accordance with a change of products to be manufactured. To be brief, this embodiment is capable of achieving a flexibility-increased semiconductor factory through alteration and recombination of flexible production lines. It is also possible to noticeably shorten or eliminate a time taken to move the semiconductor fabrication apparatuses. In addition, it is possible for this embodiment to introduce the PFC decomposition device 9 by merely installing the duct 7 within the clean room 2, without requiring movement of such semiconductor fabrication apparatuses. For this reason, upon introduction of the PFC decomposition device 9, it becomes possible to shorten a halt/shut-down time period of the semiconductor fabrication apparatus otherwise occurring due to the semiconductor production lines within such clean room 2.

This embodiment is such that the reactor 11 is subdivided into the heating unit 12 and the reaction unit 16 each having its own heater device, with the heating unit 12 and the reaction unit 16 installed on the indoor floor of a little house. This arrangement for division of the reactor 11 into two parts of the heating unit 12 and reaction unit 16 is employed because in view of the concentrated processing of PFC gases as drained out of all the semiconductor fabrication apparatuses which are installed within the clean room 2 and to which PFC gases are supplied, the total height of reactor 11 (i.e. the height of heating unit 12 and that of reaction unit 16) becomes extremely significant to an extent that which makes it difficult to transport them by land vehicles.

This embodiment merely requires connection between the gas exhaust portion of an etcher to be additionally provided and the duct 7; thus, it is possible to readily perform additional installation of any extra etcher within the clean room 2. A PFC gas to be drained out of the added etcher may be processed by the PFC decomposition device 9 which is installed outside of the clean room 2. Note here that the embodiment is arranged to remove any acidic gas (or carbon monoxide) as drained out of an etcher by the acid gas removing device 4 (or carbon monoxide removal device 6) that is installed at a location adjacent to the outlet or "exit" port of the etcher; thus, it is possible to preclude damages of working environment within the clean room 2 even where the duct 7 is damaged within the clean room 2. Additionally, improving the reliability of the duct 7 enables installation of harmful gas processing equipment for treatment of these harmful gases (carbon monoxide, chlorine and others) at a location outside of the clean room 2 and also in the upstream of the PFC decomposition device 9 to thereby achieve concentrated processing of these harmful gases.

Figure 3:
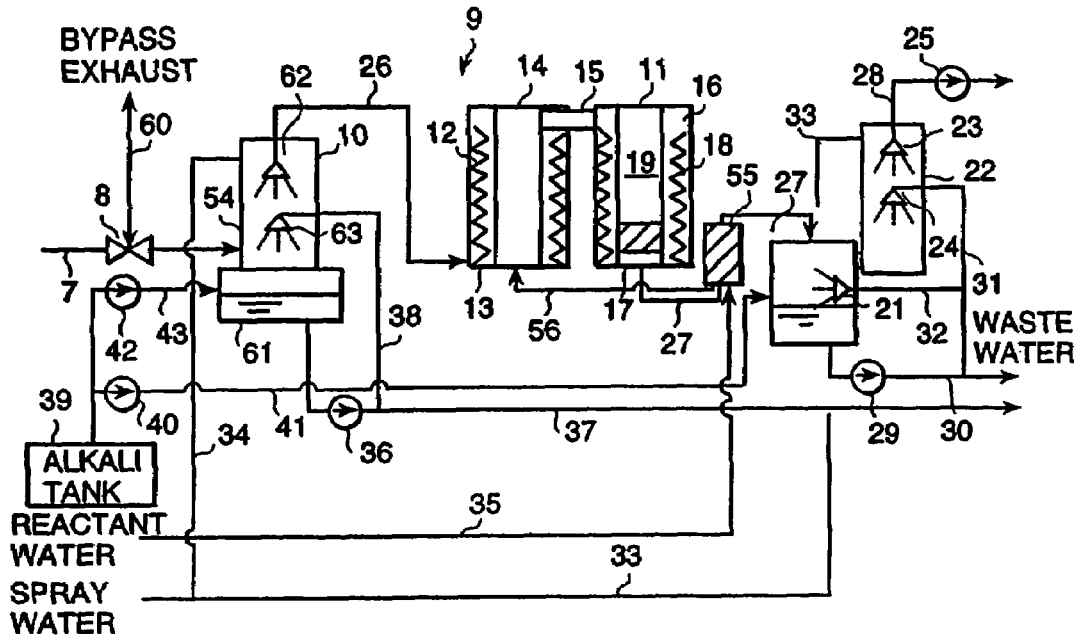
FIG. 3 is a configuration diagram of another embodiment of the wet-type PFC decomposition device.

An explanation will be given of another embodiment of the PFC decomposition device with reference to FIG. 3 below. A PFC decomposition device 9A of this embodiment is arranged so that a water vaporizer 55 is installed at the pipe 27 of the PFC decomposition device 9A, with the water supply pipe 35 being connected to the water vaporizer 55 and with a steam supply pipe 56 provided to couple together the water vaporizer 55 and the space 14 of the heating unit 12. The remaining arrangement of the PFC decomposition device 9A is the same as that of the PFC decomposition device 9 stated supra. Within the water vaporizer 55, a high-temperature exhaust gas to be supplied by the pipe 27 flows in a heat transfer pipe (not shown) whereas water (reactive water) being supplied by the water supply pipe 35 flows on the shell side. Water is heated up by the exhaust gas within the water vaporizer 55 to thereby become a steam. The steam thus generated is supplied through the steam supply pipe 56 to the space 14 and is then added to the exhaust gas.

In cases where the PFC decomposition device 9 which performs concentrated processing of PFC gases as drained out of all the etchers within the clean room 2 interrupts its PFC gas treatment operation due to malfunction or the like, semiconductor fabrication processes within such clean room 2 are all halted. In this embodiment, in emergency events in which the PFC decomposition device 9 stops, let the three-way valve 8 rotate to thereby provide connection between the duct 7 on the upstream side of the three-way valve 8 and the pipe 60. The exhaust gas which was drained out of each etcher is driven by the blower 50 to be temporarily introduced into the acidic gas removing device 47 through the pipe 60 and gas collection duct 49, rather than to the PFC decomposition device 9. Acidic gases that reside in such exhaust gas will be removed by the acidic gas removing device 47. Generally the gas processing capacity of the acidic gas removing device 47 is about ten to fifty times greater than the capacity of exhaust gas being supplied by the duct 7 to the PFC decomposition device 9. Due to this, it is possible for the acidic gas removing device 47 to remove the acidic gases residing in the exhaust gas being supplied to the PFC decomposition device 9. The resulting exhaust gas from which the acidic gases are removed is drained out of the exhaust gas cylinder 52 to external environment. During introduction of such exhaust gas via the pipe 60 to the acidic gas removing device 47, the required operation check and repair of the PFC decomposition device 9 which are malfunctioning are carried out. After completion of repairing tasks, rotate the three-way valve 8 to supply the exhaust gas to the PFC decomposition device 9. In this way, this embodiment is capable of supplying the exhaust gas via the pipe 60 to the acidic gas removing device 47 in emergency events such as malfunction or the like of the PFC decomposition device 9 whereby it becomes possible to perform operation check and repair works without requiring interruption of the semiconductor fabrication processes within the clean room 2. As a time period required for operation check and repair of the PFC decomposition device 9 is about one to two days, the amount of a PFC gas which is released to external environment without being decomposed stays at an extremely small rate with respect to the PFC gas amount to be yearly processed by the PFC decomposition device 9 in this embodiment.

This embodiment is also capable of using the PFC decomposition device 9 to process a PFC gas which is drained out of the CVD apparatus as installed in the clean room 2.

In case a machine room for installation of air purification apparatus for purifying indoor air of the clean room 2 and air-conditioning equipment of clean room 2 is provided inside of the machine-room semiconductor fabrication factory 1 or alternatively within a building associated with the semiconductor fabrication factory, the PFC decomposition device 9 may be installed within such machine room. The PFC decomposition device 9 in which the reactor 11 is divided into the heating unit 12 and reaction unit 16 does not require any reconstruction for making the ceiling of such machine room higher and thus is readily installable in the machine room.

It is also permissible to avoid installation of the three-way valve 8 and pipe 60 and instead install PFC decomposition devices 9 in parallel to the duct 7 while causing these PFC decomposition devices 9 to offer switchable operability. With such an arrangement, even if one PFC decomposition device 9 malfunctions then the other PFC decomposition device 9 is employable to perform exhaust gas processing (removal of residual acidic gases and PFC decomposition treatment). Additionally, the operation check and repair of a malfunctioning PFC decomposition device 9 may be done while continuously performing semiconductor fabrication processes.

The PFC decomposition device 9C is equipped with a reactor 11, filer devices 65, 66 and fine-particle/powder silo 81. The duct 7 is coupled to a lower-part space 68 of the filter device 65. The pipe 26 which is coupled to the heating unit 12 is coupled to an upper-part space of the filter device 65. The pipe 27 is coupled to a lower space 68 of the filter device 66. The exhaust gas duct 28 is coupled to an upper space 69 of the filter device 66. The powder silo 81 is connected by a pipe 82 to the duct 7 at a location in the downstream of the three-way valve 8 and also connected by a pipe 83 to the pipe 27, respectively.

The PFC decomposition device 9A offers the same function as the PFC decomposition device 9 and can obtain the same effects and advantages as the latter. Since the PFC decomposition device 9A is designed to use the heat of an exhaust gas drained out of the reaction unit 16 to change the reactive water into a steam, it is possible to reduce the thermal energy being applied for heat-up of the exhaust gas at the heating unit 12 of the PFC decomposition device 9A. This is because no energies are required to change the reactive water into a steam in the PFC decomposition device 9.

Even where the PFC decomposition device 9A is used in place of the PFC decomposition device 9 in the PFC processing apparatus 44 shown in FIG. 1, it is possible to obtain similar effects occurring in the PFC processing apparatus 44 of Embodiment 1.

Figure 4:
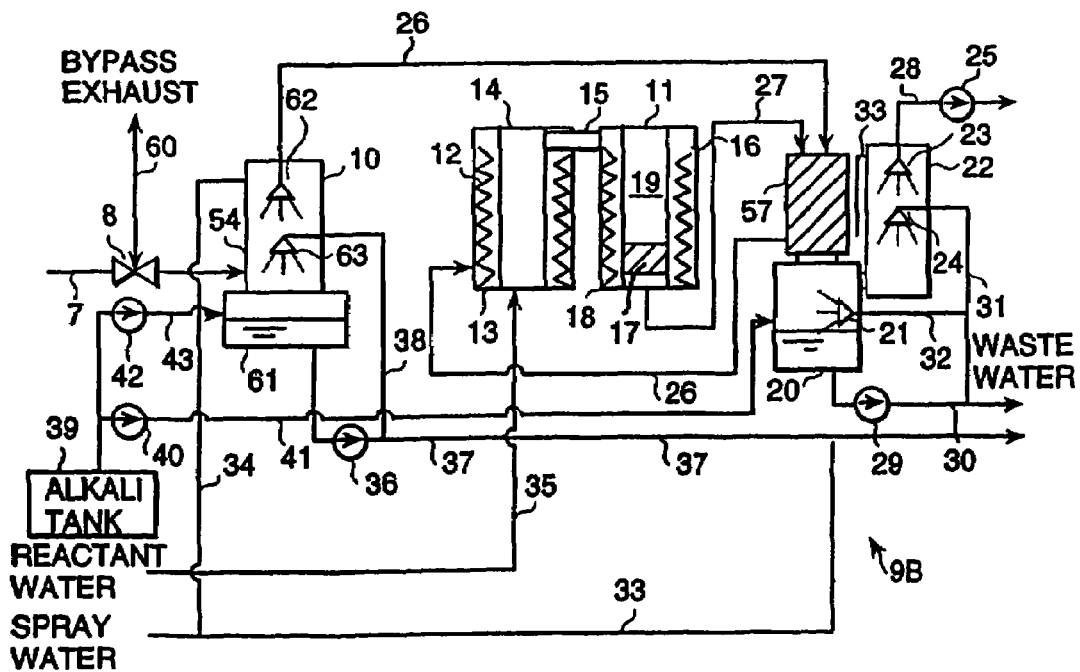
FIG. 4 is a configuration diagram of still another embodiment of the wet-type PFC decomposition device.

An explanation will be given of another embodiment of the PFC decomposition device with reference to FIG. 4 below. A PFC decomposition device 9B of this embodiment is arranged so that a gas pre-heater 57 is installed at the pipe 26 of the PFC decomposition device 9 with the pipe 26 connected via this gas preheater 57 to the space of the heating unit 12. The other arrangement of the PFC decomposition device 9B is the same as that of the PFC decomposition device 9. A high-temperature gas which is drained out of the catalyst layer 17 and supplied by the pipe 27 flows in a heat-transfer pipe (not shown) as provided within the gas preheater 57 whereas an exhaust or waste gas being supplied via the pipe 26 flows on the shell side within the gas preheater 57. The exhaust gas being supplied by the pipe 26 is heated up by the high-temperature exhaust gas as supplied by the pipe 27 and then introduced into the space 14 in the state that its temperature rose up. The high-temperature exhaust gas flowing in the heat transfer pipe that is provided within the gas preheater 57 is introduced into the cooler device 20 and then cooled down in the way stated previously.

The PFC decomposition device 9B offers the same function as the PFC decomposition device 9 and can obtain the same effects and advantages as the latter. Since the PFC decomposition device 9B is arranged to use the heat of an exhaust gas as drained out of the reaction unit 16 to heat up the exhaust gas being supplied to the heating unit 12, it is possible to reduce the thermal energy being applied for heat-up of the waste gas at the heating unit 12 of the PFC decomposition device 9B.

Even where the PFC decomposition device 9B is used in lieu of the PFC decomposition device 9 in the PFC processing apparatus 44 shown in FIG. 1, similar effects occurring in the PFC processing apparatus 44 of Embodiment 1 are obtainable.

Embodiment 2

Figure 5:
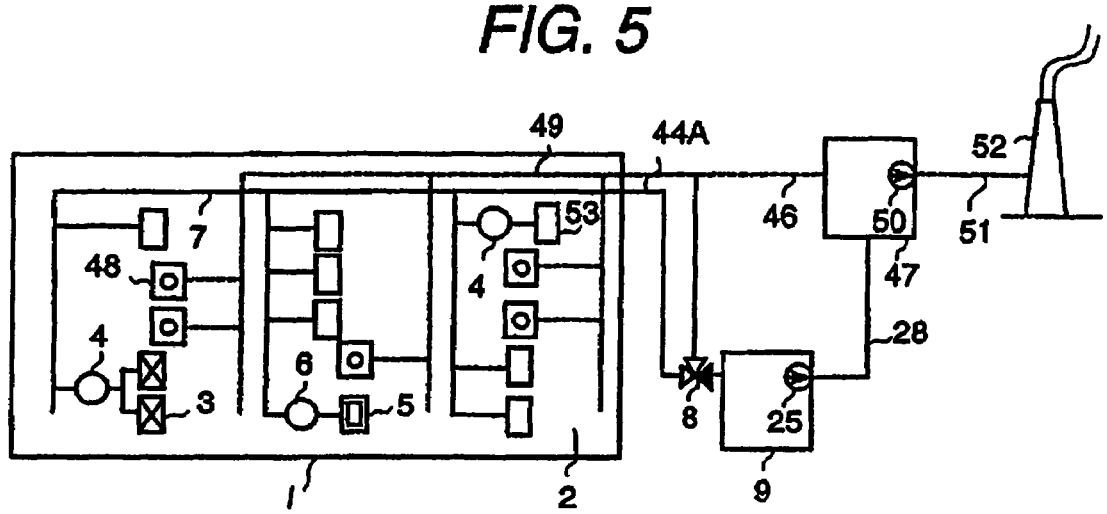
FIG. 5 is a configuration diagram of a PFC processing apparatus in accordance with another embodiment of this invention.

A PFC processing apparatus in accordance with another embodiment of the present invention will be explained with reference to FIG. 5. The PFC processing apparatus 44A of this embodiment is arranged so that the exhaust duct 28 is connected to the acidic gas removing device 47 in the PFC processing apparatus 44 shown in FIG. 1. An arrangement of the other part of PFC processing apparatus 44A is the same as that of the PFC processing apparatus 44. In this embodiment, an exhaust gas which was drained out of the acidic gas removing device 22 of the PFC decomposition device 9 is supplied through the exhaust gas duct 28 to the acidic gas removing device 47. Due to this, in case the acidic gas removing device 22 decreases in acidic gas removal functionality, any acidic gas to be produced by PFC decomposition within the reaction unit 16 can be removed by the acidic gas removing device 47. In this way, it is possible to use the acidic gas removing device 47 as a backup of the acidic gas removing device 22. The PFC processing apparatus 44A of this embodiment can also obtain the effects occurring at the above-stated PFC processing apparatus 44.

In the PFC processing apparatus 44A of this embodiment, the acidic gas removing device 22 of the PFC decomposition device 9 may be deleted to remove the acidic gas as produced by PFC decomposition within the reaction unit 16 not by the acidic gas removing device 22 but by the acidic gas removing device 47. In this case the acidic gas removing device 47 is designed to operate continuously during semiconductor manufacturing. In the PFC processing apparatus 44A, it is also possible to replace the PFC decomposition device 9 with either one of the PFC decomposition device 9A and the PFC decomposition device 9B.

Embodiment 3

A PFC processing apparatus in accordance with still another embodiment of the present invention will be explained below. The PFC processing apparatus 44B of this embodiment is arranged so that the PFC decomposition device 9 in the PFC processing apparatus 44 shown in FIG. 1 is replaced by a PFC decomposition device 9C shown in FIG. 6. The other arrangement of the PFC processing apparatus 44B is the same as that of the PFC processing apparatus 44. An arrangement of the PFC decomposition device 9C that is used in the PFC processing apparatus 44B will be explained. Whereas the PFC decomposition device 9 is a wet-type PFC decomposition device in which waste water generates the PFC decomposition device 9C used in this embodiment is a dry-type PFC decomposition device in which no waste water generates.

The high-temperature exhaust gas which was drained out of the catalyst layer 17 and which contains $CO_2$ and HF as decomposed gases is introduced into the cooler device 20. This high-temperature exhaust gas is then cooled down by the water being continuously sprayed from the spray 21 within the cooler device 20 to a temperature less than or equal to 100.degree. C. A portion of HF as produced by decomposition of $CF_4$ is resolved into the sprayed water and then removed away. Cooling of the exhaust gas may alternatively be carried out by bubbling the exhaust gas into water within a water tank. The temperature-decreased exhaust gas is introduced into the acidic gas removing device 22. The exhaust gas comes into contact with the water being sprayed from the sprays 23, 24 within the acidic gas removing device 22. Whereby, the acidic gas (produced by decomposition of PFC) such as HF contained in the exhaust gas is solved into such water and thus is removed away from the exhaust gas. In order to enhance the contact efficiency between the exhaust gas and the water while at the same time improving the efficiency of acidic gas removal, plastic-made cylindrical piece is filled within the acidic gas removing device 22. HF is reduced in amount by the acidic gas removing device 22 to fall within a range of from several % to 1 ppm or less. The resultant harmless exhaust gas is then drained away through the driving blower 25 and exhaust duct 28 plus exhaust gas cylinder 52 toward the external environment. In addition, the water that has absorbed acidic gases is drained by the acidic gas removing device 22 into the cooler device 20.

Figure 7:
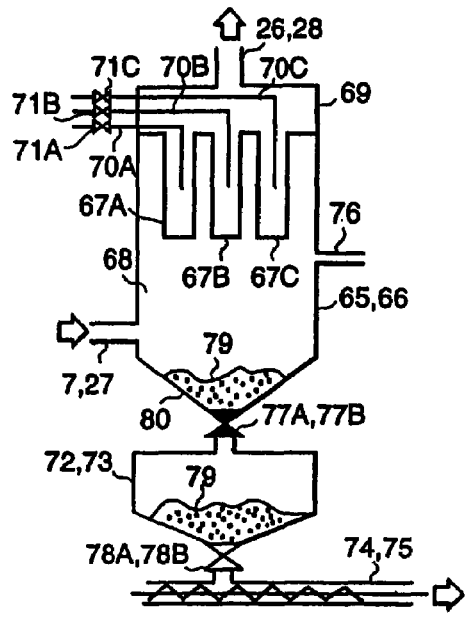
FIG. 7 is a detailed configuration diagram of a filter device of FIG. 6.

An arrangement of the filter device 65, 66 will be explained with reference to FIG. 7. The filter device 65, 66 includes a plurality of tubular filter elements 67A, 67B, 67C or the like which are installed within a vessel-like housing 80. Each filter element has a filter fabric or cloth (not shown) which is wound around an outer surface. An inside space of the vessel 80 is subdivided by each filter element into the lower space 68 and upper space 69. An air supply pipe 70A with a valve 71A provided therein is inserted from the upper part into the inside of filter element 67A. Similarly, an air supply pipe 70B with a valve 71B provided therein is inserted from the upper part into the inside of filter element 67B; an air supply pipe 70C with a valve 71C provided therein is inserted from the upper part into the inside of filter element 67C. A solid component reservoir tank 72 is connected through the valve 77A to a bottom portion of the vessel 80 of the filter device 65. A screw conveyer 74 is disposed beneath the solid component reservoir tank 72. A solid component reservoir tank 73 is connected via the valve 77B to the bottom of the vessel 80 of the filter device 66. A screw conveyer 75 is laid out below the solid component reservoir tank 73.

As has been described in Embodiment 1, the exhaust gas being guided by the duct 7 contains several impurities along with PFC (CF$_4$), examples of which are an impurity that produces solid components by reaction with water such as SiF$_4$ and WF$_6$ as produced during etching processes and an impurity that is a solid component such as SiO$_2$ and WO$_3$ or else. This exhaust gas is supplied into the lower space 68 of the filter device 65. Power particles of Ca salts as filled within the powder silo 81—typically, powder of calcium hydroxide [Ca(OH)$_2$]—is supplied through the pipe 82 to the duct 7 when a valve (not shown) opens. The powder Ca(OH)$_2$ is mixed into the exhaust gas and then flows into the lower space 68 of the filter device 65. SiF$_4$ and WF$_6$ contained in the exhaust gas experience neutralization reaction with Ca(OH)$_2$ as indicated in Equations (6) and (7) to thereby produce CaF$_2$, SiO$_2$ and WO$_3$.

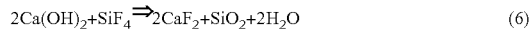

$$2Ca(OH)_2 + SiF_4 \rightleftharpoons 2CaF_2 + SiO_2 + 2H_2O \quad (6)$$

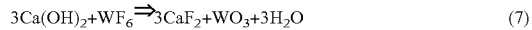

$$3Ca(OH)_2 + WF_6 \rightleftharpoons 3CaF_2 + WO_3 + 3H_2O \quad (7)$$

Further, HF contained in such exhaust gas experiences chemical reaction with Ca(OH)$_2$ indicated by Equation (8) below to thereby produce calcium fluoride (CaF$_2$). Solid components such as SiO$_2$ and WO$_3$ contained in the exhaust gas and unreacted Ca(OH)$_2$ along with CaF$_2$, SiO$_2$ and WO$_3$ as produced by the reaction of Equations (6), (7) and (8) are trapped by the filter cloth installed in each filter element 67 of the filter device 65 and are then removed away from the exhaust gas. The exhaust gas which has passed through the filter element 67 and contains CF$_4$ flows into the spaces 14, 19 within the reactor 11 through the upper space 69 and pipe 26. CF$_4$ is decomposed by the catalyst layer 17 in the way stated previously in Embodiment 1. The exhaust gas being supplied to the reactor 11 contains none of HF, SiF$_4$, WF$_6$, SiO$_2$ and WO$_3$.

The acidic gas (HF) that was produced by decomposition of CF$_4$ at the catalyst layer 17 is introduced into the space 68 of the filter device 66. Opening a valve (not shown) permits Ca(OH)$_2$ power within the powder silo 81 to be supplied by the pipe 83 to the pipe 27 and then mixed into the exhaust gas. Ca(OH)$_2$ also is introduced into the space 68. HF experiences occurrence of neutralizing reaction with Ca(OH)$_2$ as given by Equation (8) to thereby produce CaF$_2$.

$$Ca(OH)_2 + 2HF \rightleftharpoons CaF_2 + 2H_2O \quad (8)$$

This CaF$_2$ and unreacted Ca(OH)$_2$ are captured by the filter cloth within the filter device 66. During penetration of a layer of CaF$_2$ and unreacted Ca(OH)$_2$ and CaF$_2$ which was formed as a result of capture at surfaces of the filter cloth, unreacted HF reacts with such Ca(OH)$_2$ and is then fixed. Chemical reaction between HF and Ca(OH)$_2$ is accelerated at higher temperatures. As the exhaust gas drained out of the catalyst layer 17 is high in temperature, its chemical reaction is accelerated. Coolant air is supplied by a pipe 76 to the upstream side of the filter element 67 of the filter device 66, that is, into the lower space 68. This coolant air is used to cool the exhaust gas within the lower space 68 whereby the temperature of such exhaust gas is adjusted so that it is greater than or equal to about 200° C. and yet below 300° C. This is because the heat-resistance temperature of filter cloth is 300° C. Preferably the supply position of coolant air is in the downstream of a junction point of the pipe 27 and pipe 83. This is required because HF and Ca(OH)$_2$ powder are mixed and contacted together at higher temperatures to thereby efficiently execute the neutralization reaction. Under the high temperature condition, Ca(OH)$_2$ becomes CaO and then the activity as the alkali lowers. In this embodiment, in the upstream side since the reaction water is added to use the perfluoride decomposing reaction, many water components is existed, even under the high temperature condition, Ca(OH)$_2$ exists. For this reason, since the reaction shown in the formula (8) is the high temperature condition, the reaction speed is accelerated, and then HF is removed effectively. As the blower 25 is driving, the exhaust gas is drained from the filter device 66 to the exhaust duct 28. The exhaust gas being drained to the exhaust duct 28 contains no acidic gases. The exhaust gas within the exhaust duct 28 is cooled by the coolant air which is supplied from the pipe 84 into the exhaust duct 28 and thus drops down at 50° C. Due to supplement of the air which decreases to 50° C., it will no longer happen that H$_2$O generated by the reaction of Equation (8) is condensed to change into a liquid.

At the filter devices 65, 66, a difference in pressure between the upper space 69 and lower space 68 is detected by a differential pressure meter or gauge (not shown). At a filter device in which such pressure difference reaches a preset value, e.g. filter device 66, its filter elements are subjected to back washing. More specifically, the first step is to open the valve 71A. Backwash-use water which is supplied from the air supply pipe 70A is drained to the inside of filter element 67A and then passes through the filter cloth and thereafter is drained to the lower space 68. Due to the flow of this backwash-use water, solid components (such as calcium fluoride, unreacted Ca(OH)$_2$ and the like) which are attached to outer surfaces of the filter cloth drop down as a balk onto the bottom of the vessel 80. After having completed the back washing of the filter element 67A, the valve 70C is driven to open so that air is supplied from the air supply pipe 70B to the filter element 67B to thereby perform back washing of the filter element 67B. Next, the air being supplied from the air supply pipe 70B is used to perform back washing of the filter element 67C. By opening the valve 77B, solid components 79 that are accumulated at the bottom of the vessel 80 are drained to the interior of solid component reservoir tank 73. Further, the solid components 79 which have dropped down through the opened valve 78B are transferred by the screw conveyer 75 toward a solid matter collection silo (not shown) and then stored therein. Each filter element of the filter device 65 is subject to back washing in a similar way, causing the solid components 79 within the vessel 80 to be drained into the solid component reservoir tank 72 when letting the valve 77A open. Such solid components also drop down through the valve 78A and are then sent by the screw conveyer 74 to the above-noted solid matter reservoir tank. The solid components 79 within the solid matter reservoir tank are for later reuse as the raw material of cement.

Another example of the Ca salt useable in place of $Ca(OH)_2$ is powder of calcium carbonate ($CaCO_3$) or calcium oxide (CaO). Regarding reactivity with acidic gases or the like, $Ca(OH)_2$ is higher than $CaCO_3$ and CaO; thus, it is preferable to use $Ca(OH)_2$. Reaction with acidic gases or else takes place on surfaces; thus, in order to increase the surface area, it is preferable that Ca salt is in the form of powder. In case $CaCO_3$ is added to the exhaust gas within the duct 7, neutralization reaction with $SiF_4$ and $WF_6$ as defined by Equations (9) and (10) takes place.

$$2CaCO_3 + SiF_4 \Rightarrow 2CaF_2 + SiO_2 + 2CO_2 \quad (9)$$

$$3CaCO_3 + WF_6 \Rightarrow 3CaF_2 + WO_3 + 3CO_2 \quad (10)$$

In case CaO is added to the exhaust gas within the duct 7, neutralization reaction with $SiF_4$ and $WF_6$ as given by Equations (11) and (12) occurs.

$$2CaO + SiF_4 \Rightarrow 2CaF_2 + SiO_2 \quad (11)$$

$$3CaO + WF_6 \Rightarrow 3CaF_2 + WO_3 \quad (12)$$

$CaF_2$, $SiO_2$ and $WO_3$ or else as produced through each reaction of them are removed away by the filter cloth of the filter device 65.

In case $CaCO_3$ is added to the exhaust gas within the pipe 27, neutralization reaction with HF as represented by Equation (13) occurs.

$$CaCO_3 + 2HF \Rightarrow CaF_2 + H_2O + CO_2 \quad (13)$$

In case CaO is added to the waste gas within the pipe 27, neutralization reaction with HF as given by Equation (14) occurs.

$$CaO + 2HF \Rightarrow CaF_2 + H_2O \quad (14)$$

$CaF_2$ or else which was produced by each reaction of them is removed by the filter cloth of filter device 66.

In Embodiments 1 and 2 using the wet-type PFC decomposition devices, it is required to remove fluorides that are contained in the waste water as guided by the water drain pipes 30, 37 in waste-water processing equipment. Due to this, in the wastewater processing equipment, the following processing is done. More specifically, add Ca salt ($CaCO_3$ or $Ca(OH)_2$) into waste water; then, stir it. Solid components such as calcium fluoride produced by reaction between Ca salts and HF being contained in the waste water and unreacted Ca salts and others precipitate for separation. Further, add a flocculent to the waste water, causing such solid components with micro-particle diameters to aggregate or flocculate for separation. The resultant solid components thus separated such as calcium fluorides are subject to dehydration and drying processes for later reuse as the raw material of cement.

Embodiments 1 and 2 which use water to remove solid components and acidic gases in the exhaust gas should require execution of the above-stated complicated processing for removal of fluorides as contained in the waste water, resulting in production of a great amount of water. The waste water from the wastewater processing equipment contains therein an increased amount of calcium ions and is drained externally as industrial waste water. Although Embodiments 1 and 2 are capable of obtaining various effects stated above, these require wastewater processing facilities which perform complicated processing for fluoride removal.

In contrast, this embodiment is arranged to add Ca salt to the exhaust gas whereby it is possible to salvage fluorides in the exhaust gas as a reusable solid content without producing any waste water. Obviously, this embodiment requires no wastewater processing facilities. Installing the PFC processing apparatus of this embodiment which is extremely less in water use amount makes it possible to install a semiconductor fabrication factory in land areas with poor water resources. In addition, even if the environmental emission standards become stricter in near future, the embodiment may readily cope with such strictness. As the embodiment is free from a risk of waste water production, any water drain pipes are no longer required; thus, it is possible to simplify the facilities when compared to Embodiments 1 and 2 stated supra. Generally, chemical reaction in the dry state is slower in reaction rate and less in efficiency than chemical reaction in an ionized state in wet-type ones. However, wet-type PFC decomposition devices inherently require addition of an access amount of calcium salt ($Ca(OH)_2$, $CaCO_3$, CaO or else) which is several times greater than a theoretically determined value in order to remove a low concentration of F ions in waste water so that the requisite amount of Ca salt is nearly equal to that of the wet-type PFC decomposition devices.

In case $SF_6$ is used as the PFC gas in an etcher(s), $SO_3$ is produced by reaction of Equation (5) at the catalyst layer 17. This $SO_3$ reacts with the Ca salt added to the interior of pipe 27, resulting in production of calcium sulfate ($CaSO_4$). Practically explaining, in case any one of $Ca(OH)_2$, $CaCO_3$ and CaO is added, reaction represented by any one of Equations (15) to (17) occurs.

$$Ca(OH)_2 + SO_3 \Rightarrow CaSO_4 + H_2O \quad (15)$$

$$CaCO_3 + SO_3 \Rightarrow CaSO_4 + CO_2 \quad (16)$$

$$CaO + SO_3 \Rightarrow CaSO_4 \quad (17)$$

This calcium sulfate is later reusable as the raw material of cement.

This embodiment can obtain the effects and advantages occurring in Embodiment 1, including (1) the ability to downsize the clean room 2 and to readily perform layout changes of the semiconductor fabrication apparatuses, (2) easing transfer of semiconductor fabrication apparatuses such as etchers or the like within the currently established clean room and replacement of any semiconductor fabrication apparatus, (3) capability to shorten the interruption time period of semiconductor manufacture using semiconductor fabrication lines within the clean room 2 upon introduction of the PFC decomposition device 9, (4) achieving enhanced transportability by land vehicles because of subdivision of the heating unit 12 and reaction unit 16, (5) ability to readily perform additional installation of etchers within the clean room 2 because what is required is to merely connect together the gas exhaust part of an etcher to be additionally provided and the duct 7, and (6) improvement in catalyst-based PFC decomposition efficiency due to the fact that no solid components are produced through reaction with reactive water.

Figure 6:
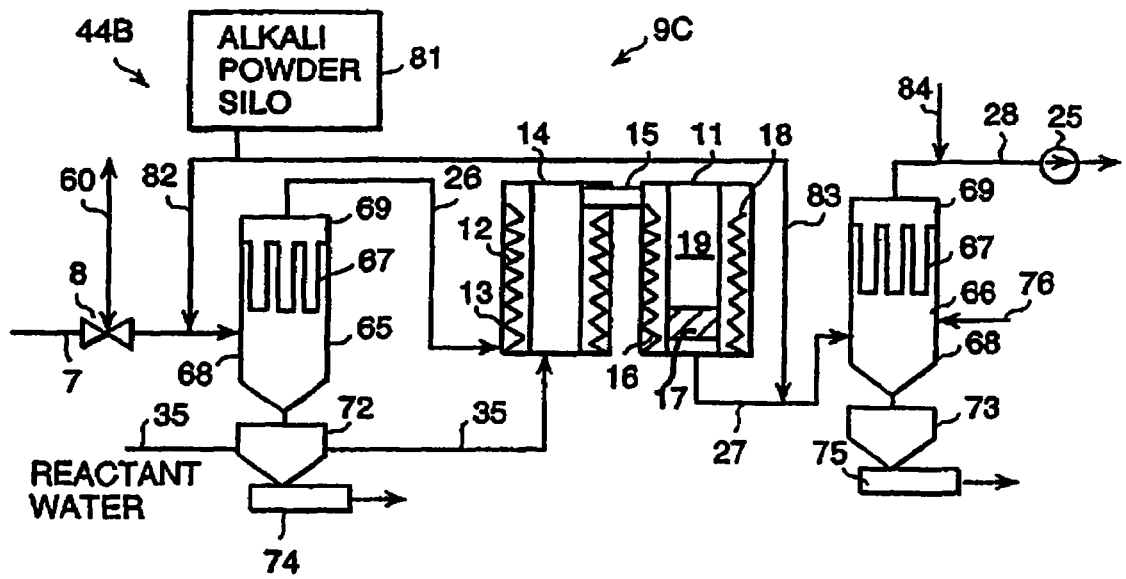
FIG. 6 is a configuration diagram of a PFC processing apparatus which is another embodiment of the invention with a dry-type PFC decomposition device applied thereto.

In the PFC decomposition device 9C of FIG. 6, slurry of Ca salt ($CaCO_3$ or $Ca(OH)_2$) may be supplied to the pipe 27 in lieu of supplement of Ca salt powder. The Ca salt is such that slurry is more readily transportable than powder, thereby facilitating supplement to the pipe 27. Water component of the Ca salt slurry is vaporized into a steam when coming into contact with a high-temperature exhaust gas being drained out of the reaction unit 16. An acidic gas (HF) in the exhaust gas reacts with Ca salt to produce calcium fluorides. The steam is guided to pass through the filter cloth and then release toward external environment through the exhaust duct 28 and exhaust cylinder 52. This embodiment is arranged to supply coolant water from the pipe 84 to thereby ensure that an exhaust gas temperature within the exhaust duct 28 stays at 100° C. Thus it is possible to avoid unwanted flocculation of the steam within the exhaust duct 28.

The PFC decomposition device 9C of this embodiment is also applicable to PFC processing apparatus with its associated PFC decomposition device installed within the clean room 2.

Figure 8:
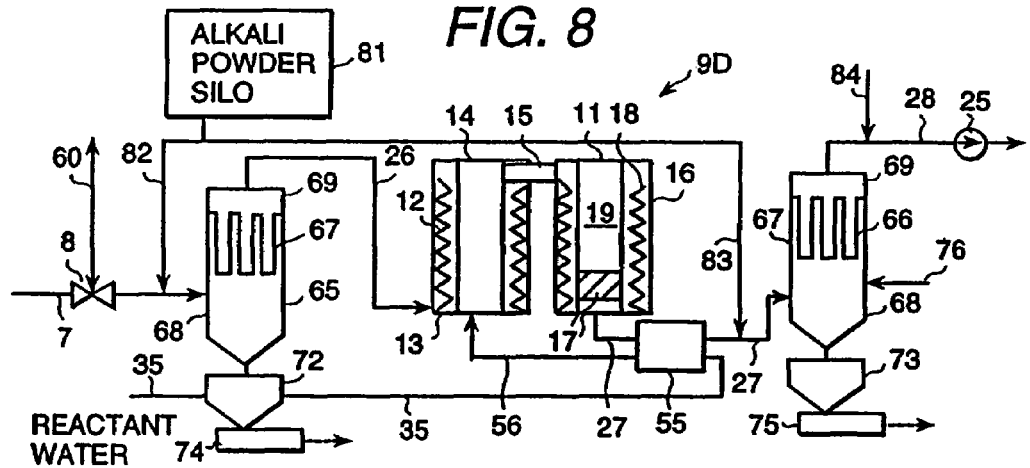
FIG. 8 is a configuration diagram of another embodiment of the dry-type PFC decomposition device.
Figure 9:
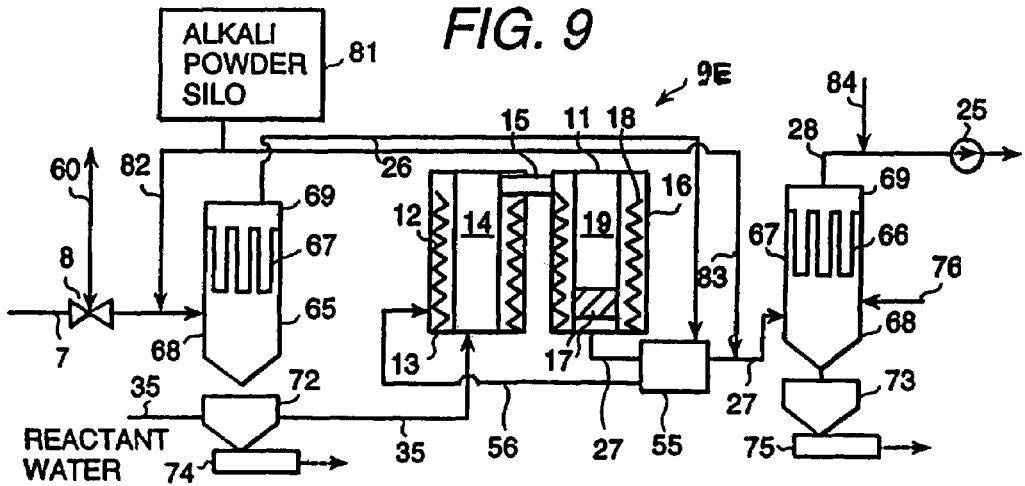
FIG. 9 is a configuration diagram of a further embodiment of the dry-type PFC decomposition device.

Other embodiments of the dry-type PFC decomposition device will be explained. A PFC decomposition device 9D (see FIG. 8) is arranged so that a water vaporizer 55 is installed at the pipe 27 in a similar way to that of the PFC decomposition device 9A while heating up the reactive water to be supplied by a water supply pipe 35. A PFC decomposition device 9E shown in FIG. 9 is designed so that a gas preheater 57 is installed at the pipe 27 for heating an exhaust gas being guided by a pipe 26. A respective one of the PFC decomposition devices 9D and 9E may be installed in the PFC processing apparatus 44B in place of the PFC decomposition device 9C of Embodiment 3. Further in the PFC processing apparatus 44A also, each of the PFC decomposition devices 9D and 9E is installable in lieu of the PFC decomposition device 9.

In a liquid crystal manufacturing system including a liquid crystal manufacturing factory also, more than one etcher (or CVD apparatus) using PFC gases is installed within a clean room as liquid crystal manufacturing equipment. Due to this, applying any one of the above-stated PFC decomposition devices 44, 44A and 44B to the liquid crystal manufacturing system makes it possible to concentratedly process PFC gases as drained out of all the etchers within the clean room. The PFC decomposition device (any one of the PFC decomposition devices 9, 9A, 9B, 9C, 9D and 9E) of such PFC processing apparatus is installed outside of the clean room in a similar way to Embodiments 1 and 2.

Although the PFC processing apparatus of each of the embodiments stated supra employs the catalyst-use PFC decomposition device as its PFC decomposition device, this PFC decomposition device is replaceable by a combustion-scheme PFC decomposition device for performing decomposition through combustion or alternatively a plasma-scheme PFC decomposition device for decomposition by changing PFC into a plasma. Additionally the blower 25 is replaceable with an ejector(s). Each of the above-stated embodiments is capable of decomposing PFCs including but not limited to $CF_4$, $CHF_3$, $C_2F_6$, $C_3F_8$, $C_4F_6$, $C_5F_8$, $NF_3$, and $SF_6$.

According to the present invention, it is possible to downsize a clean room with either semiconductor fabrication apparatus or liquid crystal manufacturing apparatus installed therein. In case the invention is applied to the currently established clean room, it is no longer required to move the semiconductor fabrication apparatus or liquid crystal manufacturing apparatus within the clean room in order to install more than one perfluoride decomposition device.

What is claimed is:

1. A perfluoride processing apparatus comprising:
    a perfluoride decomposition unit comprising a heater adapted to heat a perfluoride-containing exhaust gas and a catalytic layer containing a catalyst for decomposing said perfluoride to an acidic substance;
    an acidic substance removing unit for removing said acidic substance contained in an exhaust gas discharged from said perfluoride decomposition unit, with Ca salts; and
    a Ca salt supply unit for supplying said Ca salts in solid form to said acidic substance removing unit;
    whereby said perfluoride decomposition forms a dry-type perfluoride decomposition unit in which no waste water generates.

2. A perfluoride processing apparatus comprising:
    a perfluoride decomposition unit comprising a heater adapted to heat a perfluoride-containing exhaust gas and a catalytic layer containing a catalyst for decomposing said perfluoride to an acidic substance; and
    an acidic substance removing unit for removing said acidic substance contained in an exhaust gas discharged from said perfluoride decomposition unit with Ca salts;
    wherein said perfluoride processing apparatus comprises further:
    a reactive product substance removing unit for removing a solid reaction product of a substance contained in a perfluoride-containing gas with water, and with Ca salts; whereby an exhaust gas discharged from said reactive product substance removing unit is supplied to said perfluoride decomposition unit.

3. A perfluoride processing apparatus according to claim 1, wherein:
    said heater having a first heater device being supplied said perfluoride-containing exhaust gas and a second heater device being supplied said perfluoride-containing exhaust gas;
    said catalytic layer is filled with said catalyst; and
    said perfluoride processing apparatus comprises a reaction unit to which said perfluoride-containing exhaust gas being heated by said first and second heating devices is supplied.

4. A perfluoride processing apparatus according to claim 1, wherein:
    said acidic substance removing unit has a vessel and a filter element;
    said filter element is provided in said vessel for removing said acidic substance and for passing through said exhaust gas from which said acidic substance has been removed;
    a first piping communicating said exhaust gas being discharged from said perfluoride decomposition unit to a first space which exists at an upstream side of said filter element provided in said vessel; and
    an Ca salt supplying unit connected to said first piping and for supplying said Ca salts to said exhaust gas being discharged from said perfluoride decomposition unit which flows into said first piping.

5. A perfluoride processing apparatus according to claim 4, wherein
    said perfluoride processing apparatus comprises further: a first reactive product reservoir unit provided at a lower portion of said acidic substance removing unit and communicated to said first space and for reserving said removed first reactive product; and a first transportation unit for transporting acidic substance in said first reactive product reservoir unit.

6. A perfluoride processing apparatus comprising:
a perfluoride decomposition unit comprising a heater adapted to heat a perfluoride-containing exhaust gas and a catalytic layer containing a catalyst for decomposing said perfluoride to an acidic substance;
an acidic substance removing unit for removing said acidic substance contained in an exhaust gas discharged from said perfluoride decomposition unit, with Ca salts;
wherein: said acidic substance removing unit has a vessel and a filter element;
said filter element is provided in said vessel for removing said acidic substance and for passing through an exhaust gas from which said acidic substance has been removed;
a first piping for communicating said exhaust gas being discharged from said perfluoride decomposition unit to a first space, which exists at an upstream side of said filter element provided in said vessel; and
a Ca salt supplying unit for supplying said Ca salts to said exhaust gas which flows into said first piping, and,
wherein said perfluoride processing apparatus comprises further:
an air supply pipe for introducing a back washing use air into said acidic substance, which removes said acidic substance being adhered to said filter element, to a second space which exists at a downstream side of said filter element provided in said vessel.

7. A perfluoride processing apparatus according to claim 2, wherein said perfluoride processing apparatus comprises further Ca salt supplying unit for supplying said Ca salts to said acidic substance removing unit.

8. A perfluoride processing apparatus according to claim 3, wherein:
said acidic substance removing unit has a vessel and a filter element;
said filter element is provided in said vessel and for removing said acidic substance and for passing through said exhaust gas from which said acidic substance has been removed;
a first piping for communicating said exhaust gas which contains said substance for producing said solid component by a reaction with water to a first space which exists at an upstream side of said filter element being provided in said vessel;
a Ca salt supplying unit for supplying said Ca salts to said exhaust gas which flows into said first piping; and
a second piping for introducing said exhaust gas which has passed through said filter element, to said perfluoride decomposition unit.

9. A perfluoride processing apparatus according to claim 8, wherein
said perfluoride processing apparatus comprises further:
a second reactive product reservoir unit provided at a lower portion of said acidic substance removing unit and communicated to said first space and for reserving said removed second reactive product; and
a first transportation unit for transporting said reactive product in said second reactive product reservoir unit.

10. A perfluoride processing apparatus according to claim 8, wherein
said perfluoride processing apparatus comprises further:
an air supplying pipe for introducing a back washing use air into said acidic substance, which removes said acidic substance being adhered to said filter element, to said first space which exists at an upstream side of said filter element provided in said vessel.

11. A perfluoride processing apparatus according to claim 1, wherein said Ca salts are one selected from $Ca(OH)_2$, $CaCO_3$ and $CaO$.

12. A perfluoride processing apparatus according to claim 2, wherein
said heater having a first heater device being supplied said perfluoride-containing exhaust gas and a second heater device being supplied said perfluoride-containing exhaust gas; and
said perfluoride processing apparatus comprises further a reaction unit to which said exhaust gas being heated by said first and second heating devices is supplied.

13. A perfluoride processing apparatus according to claim 2, wherein said Ca salts are one selected from $Ca(OH)_2$, $CaCO_3$ and $CaO$.

14. A perfluoride processing apparatus comprising:
a perfluoride decomposition unit comprising a heater adapted to heat a perfluoride-containing exhaust gas and a catalytic layer filled with a catalyst for decomposing said perfluoride to an acidic substance;
a heated exhaust gas containing said perfluoride and acidic substance supply to said perfluoride decomposition unit;
an acidic substance removing unit for removing said acidic substance contained in exhaust gas discharged from said perfluoride decomposition unit; and
a reactive product substance removing unit for removing a reactive product substance for producing a solid component, which is contained in said heated exhaust gas.

* * * * *

UNITED STATES PATENT AND TRADEMARK OFFICE
CERTIFICATE OF CORRECTION

PATENT NO.      : 7,666,365 B2                                            Page 1 of 1
APPLICATION NO. : 11/108768
DATED           : February 23, 2010
INVENTOR(S)     : Kokun et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1262 days.

Signed and Sealed this

Seventh Day of December, 2010

David J. Kappos
*Director of the United States Patent and Trademark Office*